April 24, 1956     R. R. RUSHING, JR     2,742,706
PIPE MARKER
Filed Aug. 25, 1953     2 Sheets-Sheet 2
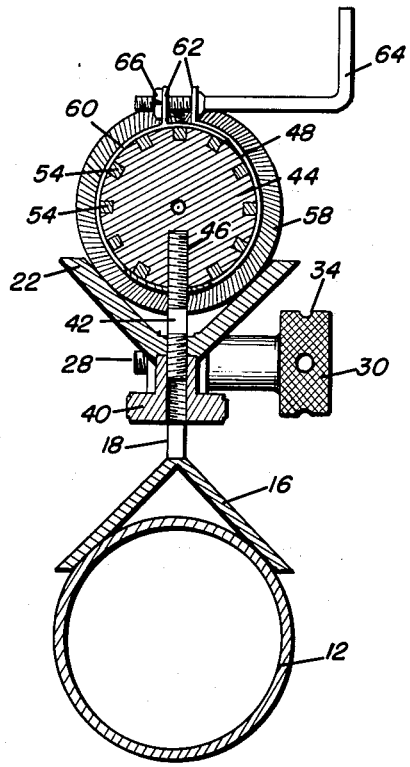
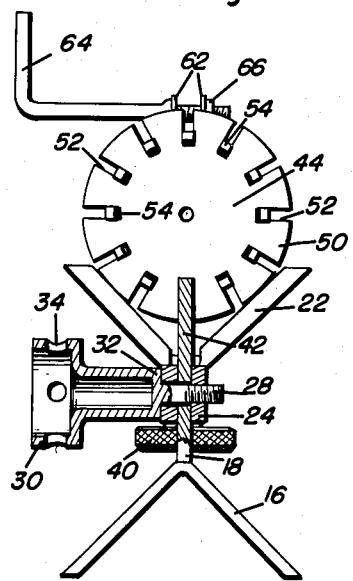
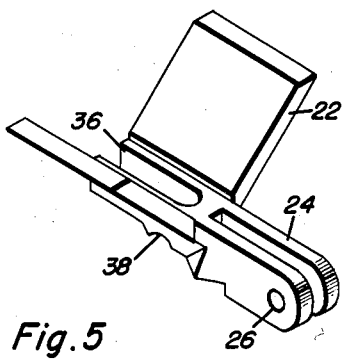
Ray R. Rushing, Jr.
INVENTOR.

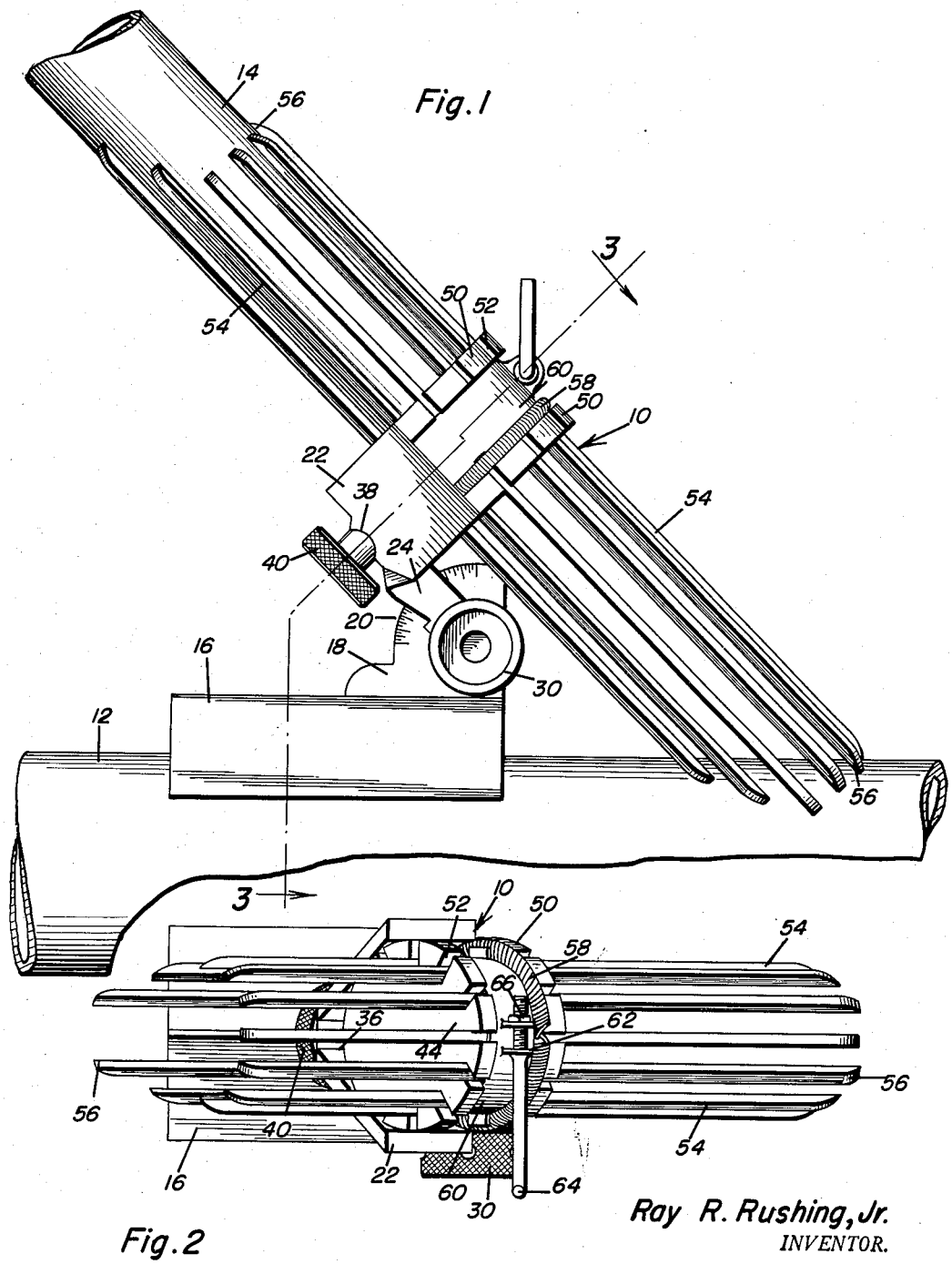

United States Patent Office 2,742,706
Patented Apr. 24, 1956

2,742,706
PIPE MARKER
Ray R. Rushing, Jr., Rotan, Tex.

Application August 25, 1953, Serial No. 376,452

3 Claims. (Cl. 33—175)

This invention relates to a pipe marker and more specifically provides a tool adapted for the marking of and forming patterns for non-planar intersections of piping and similar devices.

An object of this invention is to provide a pipe marker which may be utilized for the lay out of appropriate apertures in piping or the like, and from which a pattern for the shape of an intersecting pipe may be readily made.

Another object of this invention is to provide a pipe marker which may be used to lay out the shape of the intersection line of pipes or similar devices wherein the device is provided with an angular adjustment which provides a tool which may be utilized in various angular relationships of the joined members.

A further object of this invention is to provide a pipe marker having a plurality of slidable rods which may engage a surface to which a pipe will be joined thereby forming a templet for the shape of the aperture to be cut into the member to which the pipe is joined and wherein the opposite end of the rods may be used to indicate the shape of the joint end of the pipe member.

Yet another object of this invention is to provide a pipe marker wherein the device has a supporting base which may be utilized on flat or circular members and wherein the supporting base may be detached from the rod carrier thereby affording utilization of the marker in shaping the ends of individual pipes.

Yet another object of this invention is to provide a pipe marker which is simple in construction, easy to operate and adjust, versatile in utility, and inexpensive to manufacture.

These together with other objects and advantages which wil become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of the pipe marker of this invention showing the device mounted on the surface of a pipe for marking the shape of the juncture line;

Figure 2 is a top plan view showing the structure of Figure 1 without the supporting pipe member;

Figure 3 is a transverse, vertical section taken substantially along section line 3—3 of Figure 1 showing details of the supporting pipe, the carriage, and the rod carrier;

Figure 4 is an end elevation view of the structure as shown in Figure 3; and

Figure 5 is a detail perspective view of the carriage showing the mounting and pivoting slot in the apex of the carriage.

Referring now more specifically to the drawings, it will be seen that the numeral 10 generally designates the pipe marker of this invention supported on a pipe 12 and also engaging a pipe 14 wherein the aperture shape that will be cut in the pipe 12 and the shape of the end of the pipe 14 to be joined thereto may be determined.

It will be seen that the pipe marker 10 has a supporting base 16 built substantially in inverted V-shape having an upstanding pivot lug 18 integral with the apex of the base member 16. One edge of the upstanding lug 18 is arcuate in configuration and has indicia 20 thereon in the nature of a protractor. Pivotally mounted on the lug 18 is a carriage 22 which is substantially V-shaped and has a depending bifurcated lug 24 projecting from one edge of the apex of the carriage 22 and having suitable apertures 26 therein for receiving a pivot bolt 28 which has a narrow operating knob 30 and a shoulder 32 for abutting the bifurcations of the lug 24 thereby clamping the lug 24 to lug 18. It will be noted that the hand wheel 30 has suitable aligned apertures 34 for receiving a rod for securely binding the pivot bolt 28 and the lugs 18 and 24. Further it will be noted that the lugs 24 form a pointer for reading the indicia 20 on the lug 18 thereby indicating the angular relation between the carriage 22 and the base 16.

As best seen in Figure 25, the apex of the carriage 22 is slotted at portion 36 with the slot being open on the opposite edge of the carriage 22 from the lugs 24. The bottom edge of the slot 36 has a recessed portion 38 adjacent its bottom end for receiving the shank of a thumb screw 40 which engages a threaded member 42 that secures a carrier 44 to the carriage 22. The threaded member 42 is secured in a suitable axial bore 46 in the carrier 44. As will be seen from Figure 1, the carrier 44 is substantially the same length as the carriage 22 and is seated in the V-shaped portion of said carriage. Now looking at Figure 3 it will be seen that the carrier 44 has a central recessed portion 48 and a pair of upstanding flanges 50 forming the recessed portion 48 and the recessed portion 48 and the flanges 50 are both provided with a plurality of peripherally spaced longitudinal notches 52 wherein each of said notches 52 receive therein an elongated indicating rod 54 with both ends of said rod 54 being pointed such as at 56. Surrounding the carrier 44 and holding the rods 54 frictionally in the notches 52 is a coil spring member 58 which urges said rod 54 against the bottom of the notches 52 thereby holding the rods 54 frictionally against longitudinal movement. A split clamping band 60 is passed around the recessed portion 48 and engages the outer surface of the rods 54 which are seated in the recesses 52 and the split band 60 has a pair of projecting ears 62 having a thumb screw 64 passing therethrough and engaged by nut 66 whereby upon actuation of the thumb screw 54 the clamping band 60 engages the outer surface of the rods 54 and rigidly clamp the rods in position on the carrier 44.

The operation of the device will be readily understood. With the base member 16 resting on the pipe 12 and the proper angular relationship between the base 16 and the carriage 22 has been set up by manipulation of the hand wheel 30 and pivot bolt 28 and the carrier 44 is securely fastened on the carriage 22 by the thumb nut 40, the thumb screw 64 may be loosened thereby loosening the clamp strap 60 permitting the rods 54 to be moved longitudinally of the carrier 44 by overcoming the frictional resistance of the coil spring 58. The elongated rods 54 are pushed down toward the supporting pipe 12 until such time as the pointed ends 56 come into contact or nearly into contact with the outer surface of the pipe 12 and by marking between or around the ends 56 the specific shape of the aperture to be cut into the pipe may be laid out. Obviously, the other end of the rods 54 may be used to surround the joining end of the pipe 14 to be joined in angular relationship to the pipe 12 and the particular shape of the joint end may be laid out in a similar manner. By loosening the thumb nut 40 and removing the carrier from the carriage 22 the carrier and rods may be transported for marking the joint ends of other pipes similar to pipe 14 without the use of the base member 16. As appears obvious, this device may be used wherever a circular member is joined to another member where the second member is circular or flat and obviously the particular size of the joining pipe 14 may be varied by removing the unit as shown and substituting with a different sized unit wherein the diameter of the bottom of the notches 52 is smaller or larger as desired.

This pipe marker may be used by the mechanic who is not familiar with parallel line development which is used in developing a pattern on the drawing board and this device may be easily set up and adjusted to lay out the pattern without any expert knowledge of the layout process. Obviously, the device may be made of any suitable material such as is found throughout the tool industry. Obviously this device may be adapted for use with various sizes and shapes of structures to be joined.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A pipe marker comprising a base member having a pivot lug upstanding therefrom, a carriage pivotally secured to said lug, a rod carrier secured to said carriage, a plurality of pointed rods slidably supported on said carrier, means for resiliently and frictionally retaining the rods in adjusted position and means on said carrier to simultaneously and securely clamp said rods in adjusted position, said means engaging the outer surface of said rods thereby binding said rods to said carrier, said carriage being substantially V-shaped and provided with a depending lug thereon to be pivotally secured to the pivot lug on said base, said carriage having an open slot for receiving a threaded member extending from said carrier thereby detachably securing said carrier to said carriage.

2. A pipe marker comprising a support member, a cylindrical carrier positioned on said support, a plurality of circumferentially spaced longitudinal notches in the outer periphery of said carrier, an elongated rod in each of said notches, a resilient band encircling said rods and engaging the outer edges thereof for frictionally retaining said rods in adjusted position, and a cylindrical clamping band encircling said rods for securing said rods in position.

3. The structure as defined in claim 2 wherein said notches and rods are polygonal thereby precluding relative rotation between said rods and carrier, said carrier having a central peripheral recess for receiving and positioning said resilient band and said clamping band.

References Cited in the file of this patent

UNITED STATES PATENTS

| | | |
|---|---|---|
| 1,261,438 | Reinhardt | Apr. 2, 1918 |
| 2,222,127 | Turner | Nov. 19, 1940 |
| 2,266,457 | Wolf | Dec. 16, 1941 |
| 2,311,804 | Wright | Feb. 23, 1943 |
| 2,380,919 | Bugenhagen | Aug. 7, 1945 |
| 2,466,464 | Moore | Apr. 5, 1949 |
| 2,607,126 | Sekki | Aug. 19, 1952 |
| 2,615,255 | Rankin | Oct. 28, 1952 |